(12) United States Patent
Shiraishi et al.

(10) Patent No.: US 12,333,184 B2
(45) Date of Patent: Jun. 17, 2025

(54) RECORDING APPARATUS, RECORDING METHOD, STORAGE MEDIUM, AND MEMORY CARD

(71) Applicants: CANON KABUSHIKI KAISHA, Tokyo (JP); SONY GROUP CORPORATION, Tokyo (JP)

(72) Inventors: Yasuhiro Shiraishi, Kangawa (JP); Akio Fujii, Kanagawa (JP); Hiroshi Noda, Tokyo (JP); Ryo Akamatsu, Tokyo (JP); Tsutomu Ando, Kanagawa (JP); Hitoshi Kimura, Tokyo (JP); Daisuke Nakajima, Tokyo (JP); Toshifumi Nishiura, Tokyo (JP); Naoki Yamagata, Saitama (JP); Yoshihisa Ishikawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 101 days.

(21) Appl. No.: 17/499,267

(22) Filed: Oct. 12, 2021

(65) Prior Publication Data
US 2022/0027097 A1   Jan. 27, 2022

Related U.S. Application Data

(63) Continuation of application No. PCT/JP2020/013773, filed on Mar. 26, 2020.

(30) Foreign Application Priority Data

Apr. 17, 2019  (JP) ................................ 2019-078702

(51) Int. Cl.
  *G06F 3/06*   (2006.01)

(52) U.S. Cl.
  CPC .......... *G06F 3/0659* (2013.01); *G06F 3/0604* (2013.01); *G06F 3/061* (2013.01); *G06F 3/0679* (2013.01)

(58) Field of Classification Search
  CPC ...... G06F 3/0604; G06F 3/061; G06F 3/0679; G06F 3/0659
  (Continued)

(56) References Cited

U.S. PATENT DOCUMENTS

2002/0013866 A1 *  1/2002  Noeldner ................ G06F 13/28
                                                              710/22
2005/0216608 A1 *  9/2005  Wang ...................... G06F 13/28
                                                              710/22
(Continued)

FOREIGN PATENT DOCUMENTS

CN         104951248 A       9/2015
JP         2006-178923 A     7/2006
(Continued)

OTHER PUBLICATIONS

European Search Report Issued on Dec. 14, 2022, that issued in the corresponding European Patent Application No. 20791460.7.
(Continued)

*Primary Examiner* — Gautam Sain
(74) *Attorney, Agent, or Firm* — Cowan, Liebowitz & Latman, P.C.

(57) ABSTRACT

There is provided a recording apparatus that records data to a memory card, comprising: a control unit configured to repeatedly transmit a data recording instruction that includes information designating recording target data and a recording destination to the memory card which manages a memory for data recording in the memory card as a plurality of recording areas and which can execute data recording with a guaranteed minimum recording speed in units of (Continued)

recording areas, wherein when transmitting a first data recording instruction that designates a start portion of a first recording area as a recording destination, the control unit requests the memory card to execute data recording with the guaranteed minimum recording speed with respect to the first recording area by including a speed guarantee request in the first data recording instruction.

19 Claims, 5 Drawing Sheets

(58) Field of Classification Search
USPC .......................................................... 711/154
See application file for complete search history.

(56) References Cited

U.S. PATENT DOCUMENTS

| | | | |
|---|---|---|---|
| 2008/0250220 A1* | 10/2008 | Ito ....................... | G06F 12/0246 711/E12.001 |
| 2014/0059273 A1* | 2/2014 | Fujimoto .............. | G06F 3/0679 711/103 |
| 2015/0036995 A1* | 2/2015 | Sekiguchi ............. | H04N 5/907 386/224 |
| 2015/0074337 A1* | 3/2015 | Jo ........................ | G06F 3/0679 711/103 |
| 2015/0131386 A1* | 5/2015 | Yeh ....................... | G11C 16/14 365/185.29 |
| 2016/0274792 A1 | 9/2016 | Ogawa | |

FOREIGN PATENT DOCUMENTS

| | | |
|---|---|---|
| JP | 2008-176455 A | 7/2008 |
| JP | 2008-192153 A | 8/2008 |
| JP | 2010-140268 A | 6/2010 |
| JP | 4758518 B2 | 8/2011 |
| JP | 2014-112351 A | 6/2014 |
| JP | 2014175954 A | 9/2014 |
| JP | 2019020989 A | 2/2019 |
| JP | 2019-057193 A | 4/2019 |
| WO | 2010/146767 A1 | 12/2010 |

OTHER PUBLICATIONS

Nvm Express et al: "NVM Express 1.3 1 NVM Express", Mar. 1, 2017 (Mar. 1, 2107), XP055581807, Retrieved from the Internet: URL:https://nvmexpress.org/wp-content/uploads/NVM_Express_Revision_1.3.pdf.
International Search Report of International Application No. PCT/JP2020/013773 issued on May 20, 2020.
Dec. 16, 2022 Japanese Office Action, without an English Translation, that issued in Japanese Patent Application No. 2019-078702.
May 13, 2024 Chinese Office Action, with an English Translation, that issued in Chinese Patent Application No. 202080028674.6.
NVM Express et al: "NVM Express Revision 1.0e ", Jan. 23, 2013.
Korean Office Action issued on Apr. 9, 2024, with a translation, that issued in the corresponding Korean Patent Application No. KR10-2021-7036083.

* cited by examiner

| Bytes | Byte 3 | | | | | | | | Byte 2 | | | | | | | | Byte 1 | | | | | | | | Byte 0 | | | | | | | |
|---|---|---|---|---|---|---|---|---|---|---|---|---|---|---|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 03:00 | Command Identifier | | | | | | | | | | | | | | | | PSDT | | | | | | FUSE | | Opcode (01h) | | | | | | | |
| 07:04 | Namespace Identifier | | | | | | | | | | | | | | | | | | | | | | | | | | | | | | | |
| 15:08 | | | | | | | | | | | | | | | | | | | | | | | | | | | | | | | | |
| 23:16 | Metadate Pointer | | | | | | | | | | | | | | | | | | | | | | | | | | | | | | | |
| 31:24 | PRP Entry1 | | | | | | | | | | | | | | | | | | | | | | | | | | | | | | | |
| 39:32 | PRP Entry2 | | | | | | | | | | | | | | | | | | | | | | | | | | | | | | | |
| 43:40 | Stating LBA | | | | | | | | | | | | | | | | | | | | | | | | | | | | | | | |
| 47:44 | | | | | | | | | | | | | | | | | | | | | | | | | | | | | | | | |
| 51:48 | LR | FUA | PRINFO | | | | | | | | | | | | | | Number of Logical Blocks | | | | | | | | | | | | | | | |
| 55:52 | | | | | | | | | DSM | | | | | | | | | | | | | | | | | | | | | | | |
| 59:56 | Expected Initial Logical Block Reference Tag | | | | | | | | | | | | | | | | | | | | | | | | | | | | | | | |
| 63:60 | Expected Logical Block Application Tag | | | | | | | | | | | | | | | | Expected Logical Block Application Tag Mask | | | | | | | | | | | | | | | |

INTERPRET "1" AS SPEED GUARANTEE REQUEST

201

| Bits | Attribute | Definition | | |
|---|---|---|---|---|
| 07 | Incompressible | If set to '1', then data is not compressible for the logical blocks indicated. If cleared to '0', then no information on compression is provided. | | |
| 06 | Sequential Request | If set to '1', then this command is part of a sequential write that includes multiple Write commands. If cleared to '0', then no information on sequential access is provided. | | |
| 05:04 | Access Latency | Value | Definition | |
| | | 00b | None. No latency information provided. | |
| | | 01b | Idle. Longer latency acceptable. | |
| | | 10b | Normal. Typical latency. | |
| | | 11b | Low. Smallest possible latency. | |
| 03:00 | Access Frequency | Value | Definition | |
| | | 0000b | No frequency information provided. | |
| | | 0001b | Typical number of reads and writes expected for this LBA range. | |
| | | 0010b | Infrequent writes and infrequent reads to the LBA range indicated. | |
| | | 0011b | Infrequent writes and frequent reads to the LBA range indicated. | |
| | | 0100b | Frequent writes and infrequent reads to the LBA range indicated. | |
| | | 0101b | Frequent writes and frequent reads to the LBA range indicated. | |
| | | 0110b | One time write. E.g. command is due to virus scan, backup, file copy, or archive. | |
| | | 0111b – 1111b | Reserved | |

RECORDING APPARATUS, RECORDING METHOD, STORAGE MEDIUM, AND MEMORY CARD

CROSS-REFERENCE TO RELATED APPLICATIONS

This application is a Continuation of International Patent Application No. PCT/JP2020/013773, filed Mar. 26, 2020, which claims the benefit of Japanese Patent Application No. 2019-078702, filed Apr. 17, 2019, both of which are hereby incorporated by reference herein in their entirety.

BACKGROUND OF THE INVENTION

Field of the Invention

The present invention relates to a recording apparatus, a recording method, a storage medium, and a memory card.

Background Art

When large-sized data such as stream data is continuously written to a non-volatile memory, there is a possibility that block (the unit of data erasure) rewrite processing occurs during the data writing and the data writing speed temporarily decreases significantly.

PTL 1 discloses a technique for preventing such a decrease in writing speed. According to PTL 1, before transmitting a write command (second command) for writing data to a memory controller, an access apparatus first transmits a stream write preparation command (first command) that identifies a first write range for writing data. The memory controller then selects a new block for the writing of data to the first write range before the start of write processing. This therefore reduces the frequency of block rewrite processing during data writing.

CITATION LIST

Patent Literature

PTL 1: Japanese Patent No. 4758518

According to the technique of PTL 1, the access apparatus needs to transmit the stream write preparation command separately from the write command. This results in overhead when the technique of Patent Document 1 is used.

SUMMARY OF THE INVENTION

The present invention has been made in view of such a situation, and its object is to provide a technique that enables requesting a memory card to perform data recording with a guaranteed minimum recording speed while also suppressing overhead.

To solve the above-described problem, the present invention provides a recording apparatus that records data to a memory card, comprising at least one processor and/or at least one circuit which functions as: a control unit configured to repeatedly transmit a data recording instruction that includes information designating recording target data and a recording destination to the memory card which manages a memory for data recording in the memory card as a plurality of recording areas and which can execute data recording with a guaranteed minimum recording speed in units of recording areas, wherein when transmitting a first data recording instruction that designates a start portion of a first recording area as a recording destination, the control unit requests the memory card to execute data recording with the guaranteed minimum recording speed with respect to the first recording area by including a speed guarantee request in the first data recording instruction.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Figure 1:
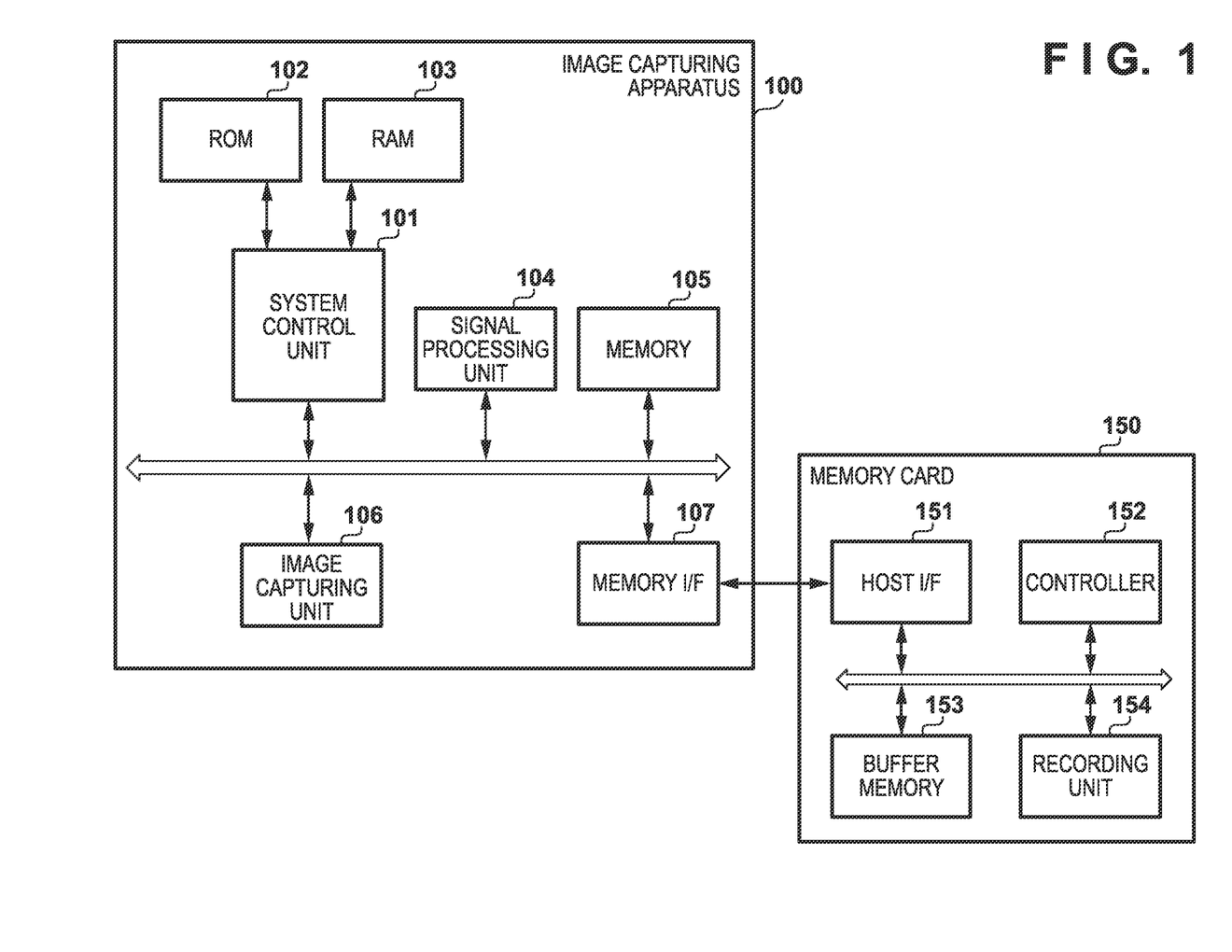
FIG. 1 is a block diagram showing the configuration of a memory card 150 and an image capturing apparatus 100, which is an example of a recording apparatus that records data to the memory card 150.

FIG. 1 is a block diagram showing the configuration of a memory card 150 and an image capturing apparatus 100, which is an example of a recording apparatus that records data to the memory card 150. There are no particular limitations on the type of memory card 150, but in the description of the present embodiment, it is assumed that the memory card conforms to the CFexpress standard, for example.

A system control unit 101 is configured by one or more processors and performs overall control of the image capturing apparatus 100 by executing a control program stored in a ROM 102. A RAM 103 is used as the work memory of the system control unit 101. A signal processing unit 104 performs appropriate signal processing that corresponds to the type of data handled by the image capturing apparatus 100. A memory 105 temporarily stores data that is to be recorded to the memory card 150. An image capturing unit 106 generates image data from an optical image of a subject. A memory I/F 107 is an interface for communicating with a host I/F 151 of the memory card 150.

The host I/F 151 is an interface for communicating with the memory I/F 107 of the image capturing apparatus 100. A controller 152 performs overall control of the memory card 150. A buffer memory 153 temporarily stores recording target data that is received from the image capturing apparatus 100. A recording unit 154 is a non-volatile memory in which recording target data is recorded. Note that the controller 152 may directly record recording target data to the recording unit 154 without storing the recording target data in the buffer memory 153.

Some memory cards 150 can operate with a guaranteed speed, while others cannot operate with a guaranteed speed.

If the memory card 150 can operate with a guaranteed speed, the recording unit 154 for data recording in the memory card is managed as a plurality of recording areas. The recording areas are related to the unit of data erasure of the recording unit 154, and the memory card 150 can execute data recording with a guaranteed minimum recording speed. In data recording in which the minimum recording speed is guaranteed, data recording is performed in units of recording areas. Here, "data recording with a guaranteed minimum recording speed" refers to data recording performed while guaranteeing a minimum recording speed such as "10 megabytes/second or more" for a recording apparatus such as the image capturing apparatus 100. Examples of data recording with recording areas related to the data erasure unit and a guaranteed minimum recording speed include Allocation Unit (AU) and video speed class writing, which are specified in the SD standard. In the following description, a recording area is sometimes referred to as an AU for convenience. However, the present embodiment is not limited to the SD standard, and as described above, the CFexpress standard will be described as an example in the present embodiment. Also, in the present embodiment, the procedure by which the image capturing apparatus 100 requests the memory card 150 to execute data recording with a guaranteed minimum recording speed is a new procedure that is different from the existing SD standard.

In the case of a memory card that cannot operate with a guaranteed speed, the recording unit 154 cannot execute data recording with a guaranteed minimum recording speed, and guaranteed-speed data recording processing, which will be described later, is not performed.

Next, data recording processing of the present embodiment will be described. The system control unit 101 of the image capturing apparatus 100 starts data recording processing in response to the start of moving image shooting, for example. In the data recording processing, the system control unit 101 repeatedly transmits a data recording instruction that includes information for designating recording target data and a recording destination to the memory card 150, which has a speed guarantee function. In addition to the information that specifies the recording target data and the recording destination, the data recording instruction may also include information that specifies the size of the recording target data. In the data recording processing of the present embodiment, it is assumed that the system control unit 101 records moving image data, which is temporarily stored in the memory 105, to the memory card 150 in data units of a predetermined size (for example, 32 MB). Accordingly, the recording target data that corresponds to one data recording instruction is 32 MB of moving image data. The recording destination is designated by a logical block address (LBA) of the recording unit 154.

Figure 2:
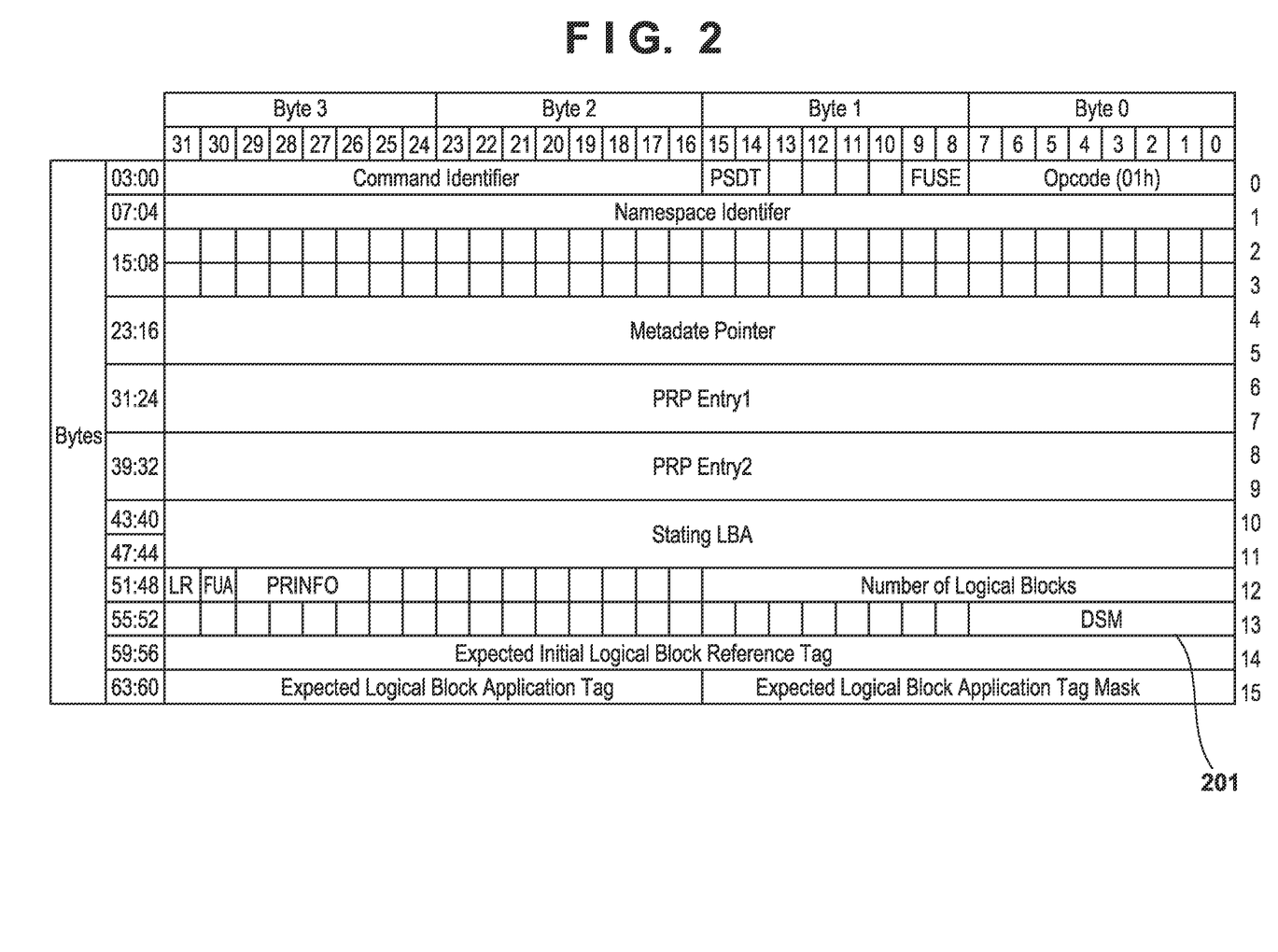
FIG. 2 is a diagram showing an example of the configuration of a data recording instruction.

FIG. 2 is a diagram showing an example of the configuration of a data recording instruction. In the description of the present embodiment, it is assumed that a write command compliant with the NVMe standard is used as the data recording instruction. In this case, the recording target data is designated using PRP Entry 1 and PRP Entry 2 (bytes 24 to 39), and the recording destination is designated using Starting LBA (bytes 40 to 47). The size of the recording target data is designated using Number of Logical Blocks (bytes 48 to 49). Also, in the present embodiment, a portion of a DSM field 201 (Dataset Management field) is used for a speed guarantee request.

Figure 3:
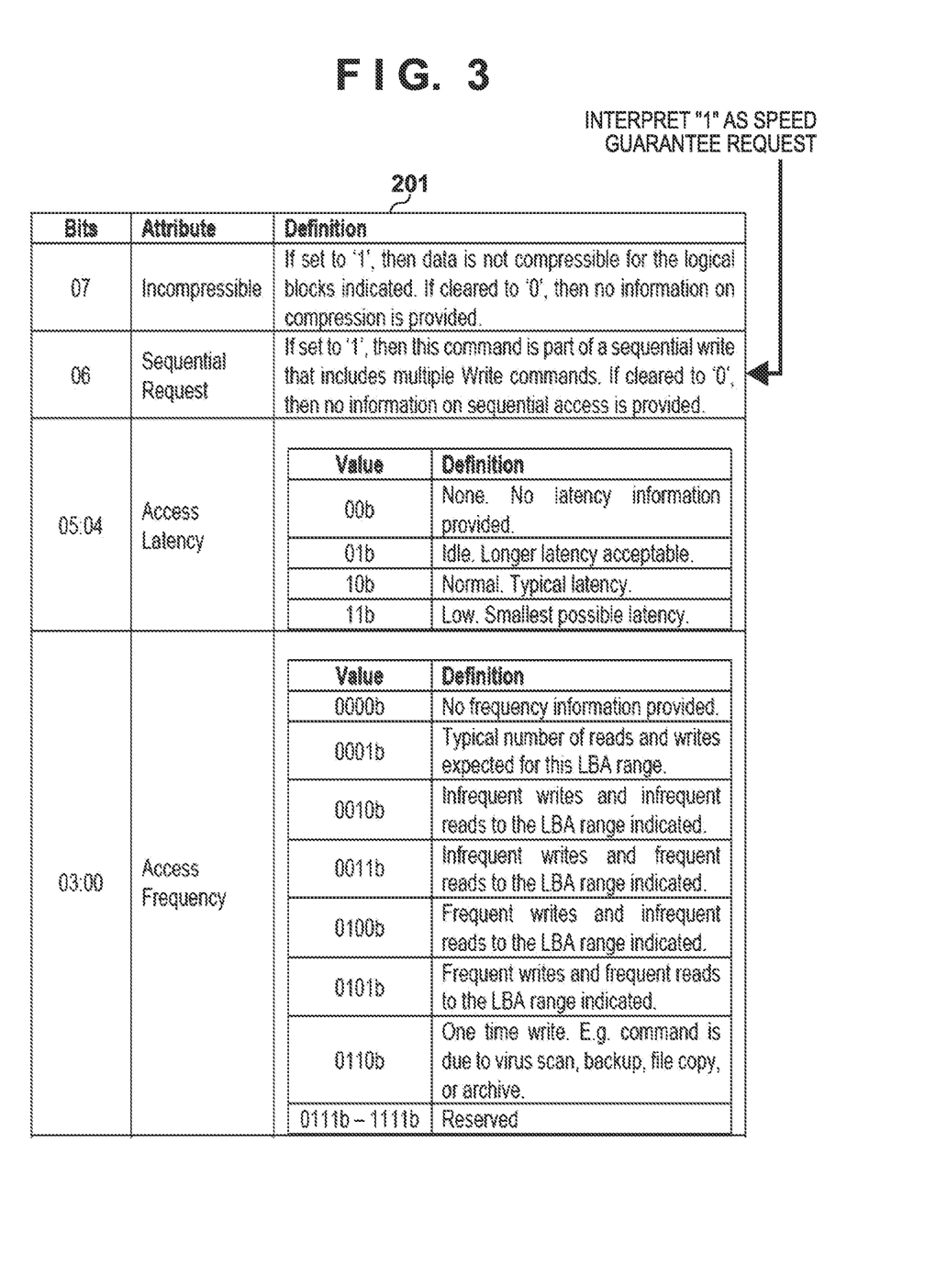
FIG. 3 is a diagram showing the configuration of a DSM field 201.

FIG. 3 is a diagram showing the configuration of the DSM field 201. The DSM field 201 includes a Sequential Request bit. In the present embodiment, if the Sequential Request bit is "1" this means that the write command includes a speed guarantee request.

Figure 4A:
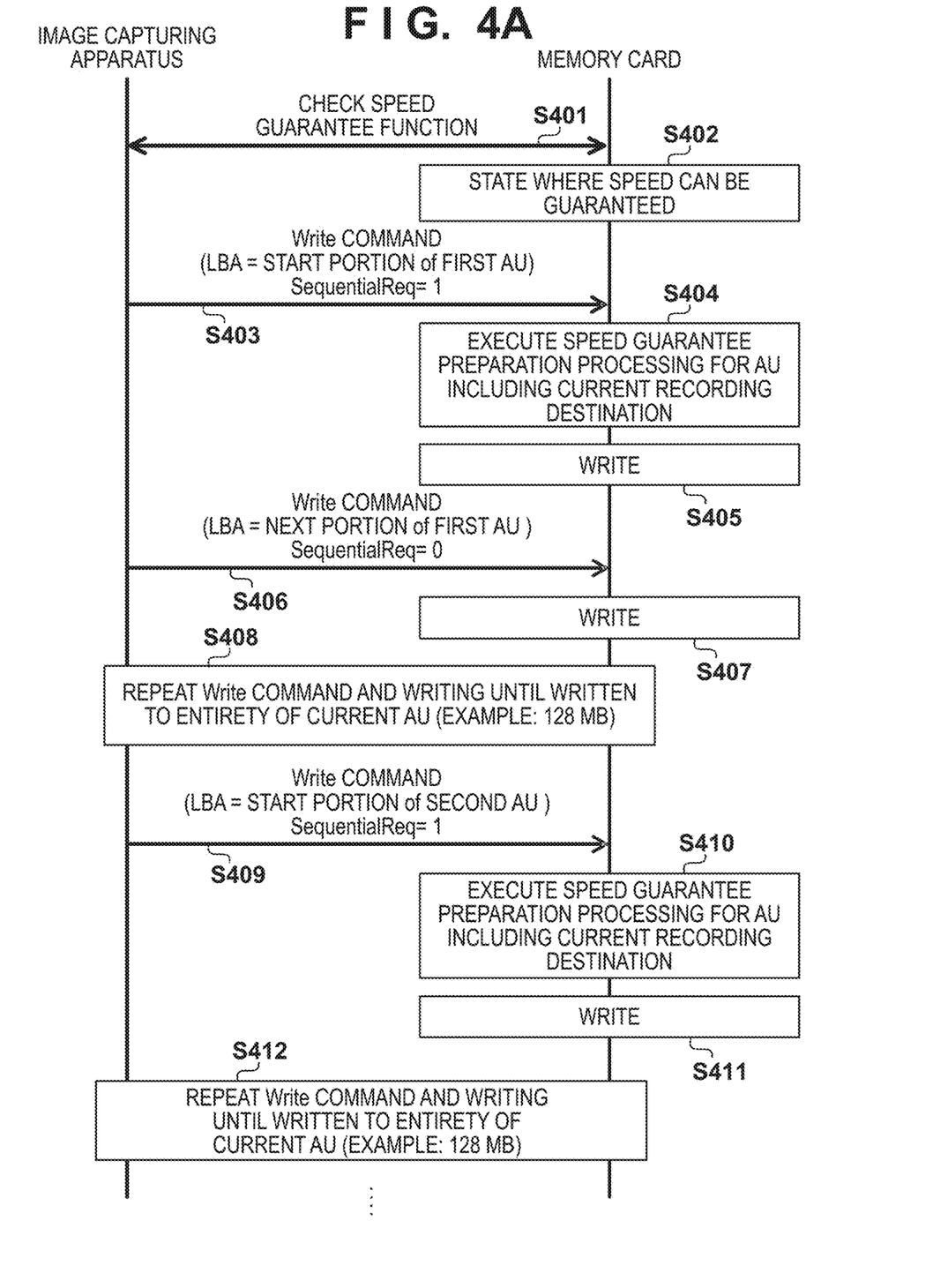
FIGS. 4A and 4B are sequence diagrams of data recording processing.

FIG. 4A is a sequence diagram of data recording processing.

In S401, the system control unit 101 of the image capturing apparatus 100 checks whether the memory card 150 has a speed guarantee function. Specifically, information regarding the functions and performance of the memory card 150 is acquired from the memory card 150, and it is determined whether or not the connected memory card 150 has a speed guarantee function based on the acquired information. If it is determined that the memory card has a speed guarantee function, the data recording processing shown in FIG. 4A is executed, and if it is determined that the memory card does not have a speed guarantee function, normal data recording is performed.

In S402, the memory card 150 is in a state where the speed can be guaranteed.

In S403, the system control unit 101 transmits, to the memory card 150, a write command that specifies the start portion of an AU that does not include recorded data as the recording destination. At this time, the system control unit 101 includes a speed guarantee request in the write command by setting the Sequential Request bit to 1. In response to this speed guarantee request, the system control unit 101 requests the memory card 150 to execute data recording with a guaranteed minimum recording speed in the AU that includes the current recording destination. In this way, in S403, with use of a write command, the system control unit 101 specifies the address of the start portion of an AU as the data recording destination, and also requests guaranteed-speed data recording using the Sequential Request bit. Because the data recording destination is the same as the address of the AU for which speed is to be guaranteed, the recording destination address and the speed guarantee request are transmitted using a write command instead of transmitting the address of the AU for which speed is to be guaranteed. In S403, the start portion of the AU that does not include recorded data is designated as the recording destination, but it is also possible to specify an AU that includes recorded data. However, in this case, data is overwritten, and therefore the previously recorded data is erased. In order to determine whether or not an AU includes recorded data, the system control unit 101 acquires file system information, which is for managing data of the recording unit 154 in the system control unit 101, from the recording unit 154 of the memory card 150, and determines whether an AU is an AU in which no data is recorded.

Figure 4B:
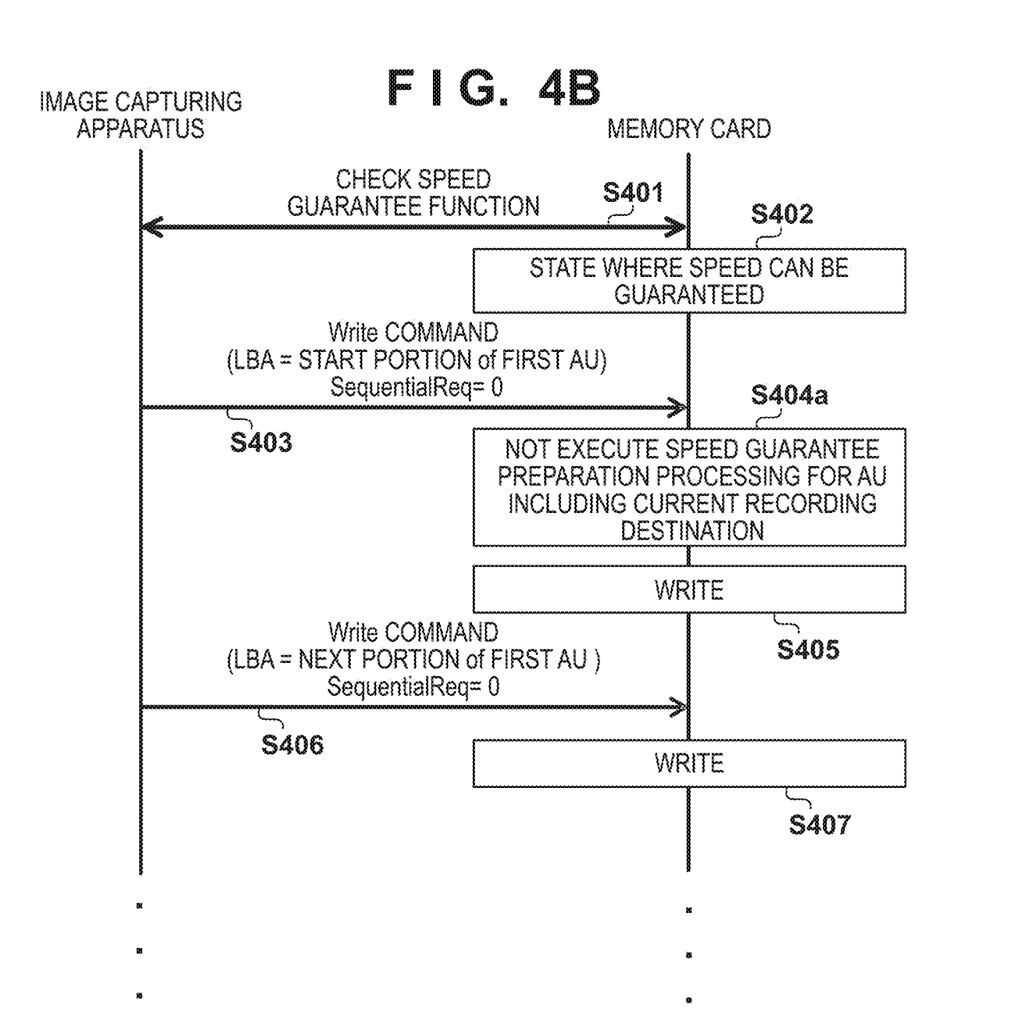

In S404, because a speed guarantee request is included in the write command received in S403 (the Sequential Request bit is 1), and the address designated as the recording destination is the start address of an AU, the controller 152 of the memory card 150 executes speed guarantee preparation processing for the AU whose start address is the address designated in the recording destination. The speed guarantee preparation processing may include, for example, processing for selecting a new physical block, but is not limited to specific processing, and may be any processing that enables data recording with a guaranteed minimum recording speed in the AU that includes the current recording destination. As shown in FIG. 4B, if in S403, the received write command does not include the speed guarantee request (the Sequential Request bit is 0), the controller 152 of the memory card 150 does not execute speed guarantee preparation processing in S404a even if the start address of an AU is designated as the recording destination. In other words, guaranteed-speed data recording is not executed in S404a. Also, even in the case where the received write command contains a speed guarantee request, if an address that is not the start address of an AU is designated as the recording destination, speed guarantee preparation processing is not performed for the AU that includes the address designated as the recording destination.

Meanwhile, as previously described, in PTL 1, the access apparatus needs to transmit a stream write preparation command separately from a write command in order to cause the memory controller to select a new block for writing data. Also, the stream write preparation command or the next write command needs to identify the first write range.

However, in the present embodiment, it is not necessary to transmit a command such as the stream write preparation command separately from the write command. In addition, the write command includes information (an address) that specifies the recording destination of the recording target data in the write command, but does not include information that explicitly specifies a speed guarantee target AU. Even if there is no explicit specification of a speed guarantee target AU, given that the write command includes information specifying the recording destination and the speed guarantee request, the memory card 150 can determine the speed guarantee target AU. If a speed guarantee request is included and the start portion of an AU is designated as the recording destination (the start address of AU is designated as the recording destination address), speed guarantee preparation processing can be executed for the AU that includes the recording destination (the AU whose start address is the recording destination address). The speed guarantee request can be expressed with a relatively small amount of information because it is only necessary to identify whether or not speed guarantee is requested, and therefore may simply be the Sequential Request bit (i.e., only one bit), for example.

Therefore, according to the present embodiment, a command for causing the memory card to perform speed guarantee preparation processing is not sent separately from the write command, and therefore the recording of data with a guaranteed minimum recording speed can be realized without incurring more overhead than in PTL 1. Also, according to the present embodiment, by merely transmitting information (an address) that specifies a data recording destination and a speed guarantee request (Sequential Request bit) to the memory card using the write command, the memory card can specify the speed guarantee target AU. For this reason, a recording destination address is transmitted in order to specify the recording destination, but an AU address for specifying the AU for which speed is to be guaranteed is not transmitted, and therefore the speed guarantee target AU can be designated with a small amount of information.

Returning to FIG. 4A, in S405, the controller 152 of the memory card 150 writes the recording target data to the recording unit 154 in accordance with the recording destination designated by the write command that was received in S403. Because data is to be recorded in the AU that was specified as the speed guarantee target in S404, the controller 152 executes guaranteed-speed data recording.

In S406, the system control unit 101 transmits, to the memory card 150, a write command that specifies the next part of the same AU as the recording destination. Because the memory card has already be notified of the AU included in the recording destination as the speed guarantee target in S403, the system control unit 101 sets the Sequential Request bit to 0 in the write command at this time.

In S407, the controller 152 of the memory card 150 writes the recording target data to the recording unit 154 in accordance with the recording destination designated by the write command received in S406. Even if the write command does not include a speed guarantee request, the controller 152 executes guaranteed-speed data recording because data is recorded in the AU that was specified as the speed guarantee target in S404.

Note that the Sequential Request bit of the write command in S406 may be set to 1. In this case, because the recording destination is not the start portion of the AU, the memory card 150 does not perform speed guarantee preparation processing (speed guarantee preparation processing for the AU that includes the recording destination at this time has already been completed in S404). Conversely, if the memory card 150 receives a write command in which the start portion of the AU is designated as the recording destination and the Sequential Request bit is set to 1, the memory card 150 performs speed guarantee preparation processing for the AU that includes the designated recording destination.

In S408, the system control unit 101 and the memory card 150 repeat the transmission of the write command and the writing of the recording target data until data has been written to the entirety of the current AU (for example, 128 MB). The system control unit 101 controls the repeated transmission of the write command in S403 to S408 such that portions of the same AU are designated in order from the start portion to the end portion.

In S409, the system control unit 101 transmits, to the memory card 150, a write command that designates the start portion of another AU that does not include recorded data as the recording destination. At this time, the system control unit 101 includes a speed guarantee request in the write command by setting the Sequential Request bit to 1. In response to this speed guarantee request, the system control unit 101 requests the memory card 150 to execute data recording with a guaranteed minimum recording speed with respect to the AU that includes the current recording destination.

The processing of S410 to S411 is similar to the processing of S404 to S405. Also, the processing of S412 is similar to the processing of S406 to S408, and the system control unit 101 and the memory card 150 repeatedly transmit a write command and write recording target data until data has been written to the entirety of the current AU (for example, 128 MB).

Subsequently, the system control unit 101 and the memory card 150 repeat processing similar to that in S409 to S412 until there is no unrecorded data due to, for example, the end of shooting.

Note that after the transmission of a write command that designates the end portion of a specific AU as the recording destination, there are cases where a write command that includes a speed guarantee request and designates the start portion of another AU that does not include recorded data as the recording destination is to be transmitted. For example, this is a case where S409 is to be executed after the transmission of a write command that designates the end portion of an AU as the recording destination in S408. In such a case, the system control unit 101 may include the speed guarantee request in the write command that designates the end portion of the AU as the recording destination. Accordingly, the system control unit 101 can notify the memory card 150 in advance that a write command that includes the speed guarantee request and designates the start portion of another AU as the recording destination is to be transmitted after the current write command.

As described above, according to the first embodiment, the image capturing apparatus 100 repeatedly transmits, to the memory card 150 that has the speed guarantee function, a write command (data recording instruction) that includes information that designates recording target data and a recording destination. Here, when transmitting the write command that designates the start portion of the AU as the recording destination, the image capturing apparatus 100 includes a speed guarantee request in that write command. Accordingly, the image capturing apparatus 100 requests the memory card 150 to perform data recording with a guaranteed minimum recording speed in the AU that includes the current recording destination. Therefore, according to the present embodiment, it is possible to request the memory card 150 to perform data recording with a guaranteed minimum recording speed while also suppressing overhead.

Note that when the image capturing apparatus 100 transmits a write command that designates the start portion of an AU as the recording destination to the memory card 150 that has the speed guarantee function, if the write command does not include the speed guarantee request, normal-speed data recording processing is executed instead of guaranteed-speed data recording processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A recording apparatus that records data to a memory card, comprising at least one processor and/or at least one circuit which functions as:
a control unit configured to repeatedly transmit a data write command that includes information designating recording target data and a recording destination to the memory card which manages a memory for data recording in the memory card as a plurality of recording areas and which can execute data recording with a guaranteed minimum recording speed in units of recording areas,
wherein the control unit controls requesting the memory card to execute data recording with the guaranteed minimum recording speed or without the guaranteed minimum recording speed by a data write command, based on a combination of both of (i) whether or not a recording destination designated by the data write command is a start portion of one of the plurality of recording areas and (ii) whether or not the data write command includes data indicating a speed guarantee request,
wherein in a case of requesting the memory card to execute data recording with the guaranteed minimum recording speed, the control unit performs control to transmit a data write command that includes both of (a) information designating a start portion of a first recording area, which is one of the plurality of recording areas, as a recording destination and (b) the data indicating the speed guarantee request, and
wherein in a case of requesting the memory card to execute the data recording without the guaranteed minimum recording speed, the control unit (i) performs control to transmit a data write command that includes information designating, as a recording destination, a portion, different from a start portion, of one of the plurality of recording areas, regardless of whether or not the data write command includes the data indicating the speed guarantee request or (ii) performs control to transmit a data write command that includes, as a recording destination, information designating a start portion of one of the plurality of recording areas without including the data indicating the speed guarantee request.

2. The recording apparatus according to claim 1, wherein the data write command repeatedly transmitted by the control unit includes information that designates a size of the recording target data in addition to the information that designates the recording target data and the recording destination.

3. The recording apparatus according to claim 1, wherein the control unit:
performs control in the repetition such that portions of the first recording area are designated in order from the start portion to an end portion, and
after transmission of a second data write command that designates the end portion of the first recording area as a recording destination, if a third data write command that designates a start portion of a second recording area, which is one of the plurality of recording areas and which is different from the first recording area, as a recording destination and includes the speed guarantee request is to be transmitted, notifies the memory card of transmission of the third data write command in advance by including the speed guarantee request in the second data write command.

4. The recording apparatus according to claim 1, wherein the control unit determines whether or not the memory card is a memory card that can execute data recording with the guaranteed minimum recording speed, and, in a case where the memory card is determined to be a memory card that can execute data recording with the guaranteed minimum recording speed, when transmitting the first data write command that designates the start portion of the first recording area as the recording destination, the control unit requests the memory card to execute data recording with the guaranteed minimum recording speed with respect to the first recording area by including the speed guarantee request in the first data write command.

5. The recording apparatus according to claim 1, wherein the data write command that is repeatedly transmitted by the control unit is an NVMe standard-compliant write command.

6. The recording apparatus according to claim 5, wherein the speed guarantee request is a value of 1 being set at a Sequential Request bit in a Dataset Management field of the write command.

7. The recording apparatus according to claim 1, wherein when transmitting the first data write command that designates, as a recording destination, a start portion of the first recording area, in the memory for data recording in the memory card, which is determined not to include recorded data, the control unit requests the memory card to execute data recording with the guaranteed minimum recording speed with respect to the first recording area by including the speed guarantee request in the first data write command.

8. The recording apparatus according to claim 1, wherein the control unit requests the memory card to execute the data recording with the guaranteed minimum recording speed with respect to entirety of the first recording area, not only the start portion of the first recording area, by including the speed guarantee request in the first data write command that designates the start portion of the first recording area as the recording destination.

9. The recording apparatus according to claim 1, wherein the control unit:
performs control in the repetition of transmitting a data write command such that data write commands, which respectively designate portions of the first recording area as recording destinations in order from the start portion to an end portion, are transmitted; and
after transmission of a first data write command that includes both of information designating the start portion of the first recording area as a recording destination and the data indicating the speed guarantee request,
for a data write command which designates a portion of the first recording area other than the start portion as a recording destination, transmits the data write command without including data indicating the speed guarantee request in the data write command, even in a case where the control unit causes the memory card to execute data recording with the guaranteed minimum recording speed.

10. A recording apparatus that records data to a memory card, comprising at least one processor and/or at least one circuit which functions as:
a control unit configured to repeatedly transmit an NVMe standard-compliant write command that includes information designating recording target data and a recording destination to the memory card which can execute data recording with a guaranteed minimum recording speed,
wherein the control unit controls requesting the memory card to execute data recording with the guaranteed minimum recording speed or without the guaranteed minimum recording speed by a write command, based on a combination of both of (i) whether or not a recording destination designated by the write command is a start portion of a recording area and (ii) whether or not the write command includes 1 at a Sequential Request bit in a Dataset Management field of the write command,
wherein in a case of requesting the memory card to execute data recording with the guaranteed minimum recording speed, the control unit performs control to transmit a write command that includes both of (a) information designating a start portion of a first recording area as a recording destination and (b) 1 at a Sequential Request bit in a Dataset Management field of the first write command, and
wherein in a case of requesting the memory card to execute the data recording without the guaranteed minimum recording speed, the control unit (i) performs control to transmit a write command that includes information designating, as a recording destination, a portion, different from a start portion, of a recording area, regardless of whether or not the write command includes 1 at a Sequential Request bit in a Dataset Management field of the write command or (ii) performs control to transmit a write command that includes, as a recording destination, information designating a start portion of a recording area without including 1 at a Sequential Request bit in a Dataset Management field of the write command.

11. A recording method executed by a recording apparatus that records data to a memory card, comprising:
repeatedly transmitting a data write command that includes information designating recording target data and a recording destination to the memory card which manages a memory for data recording in the memory card as a plurality of recording areas and which can execute data recording with a guaranteed minimum recording speed in units of recording areas;
controlling requesting the memory card to execute data recording with the guaranteed minimum recording speed or without the guaranteed minimum recording speed by a data write command, based on a combination of both of (i) whether or not a recording destination designated by the data write command is a start portion of one of the plurality of recording areas and (ii) whether or not the data write command includes data indicating a speed guarantee request,
wherein in a case of requesting the memory card to execute data recording with the guaranteed minimum recording speed performing control to transmit a data write command that includes both of (a) information designating a start portion of a first recording area, which is one of the plurality of recording areas, as a recording destination and (b) the data indicating the speed guarantee request, and
wherein in a case of requesting the memory card to execute the data recording without the guaranteed minimum recording speed, (i) performing control to transmit a data write command that includes information designating, as a recording destination, a portion, different from a start portion, of one of the plurality of recording areas, regardless of whether or not the data write command includes the data indicating the speed guarantee request or (ii) performing control to transmit a data write command that includes, as a recording destination, information designating a start portion of one of the plurality of recording areas without including the data indicating the speed guarantee request.

12. A recording method executed by a recording apparatus that records data to a memory card, comprising:
repeatedly transmitting an NVMe standard-compliant write command that includes information designating recording target data and a recording destination to the memory card which can execute data recording with a guaranteed minimum recording speed;
wherein the control unit controls requesting the memory card to execute data recording with the guaranteed minimum recording speed or without the guaranteed minimum recording speed by a write command, based on a combination of both of (i) whether or not a recording destination designated by the write command is a start portion of a recording area and (ii) whether or not the write command includes 1 at a Sequential Request bit in a Dataset Management field of the write command,
wherein in a case of requesting the memory card to execute data recording with the guaranteed minimum recording speed, the control unit performs control to transmit a write command that includes both of (a) information designating a start portion of a first recording area as a recording destination and (b) 1 at a Sequential Request bit in a Dataset Management field of the first write command, and
wherein in a case of requesting the memory card to execute the data recording without the guaranteed minimum recording speed, (i) performing control to transmit a write command that includes information designating, as a recording destination, a portion, different from a start portion, of a recording area, regardless of whether or not the write command includes 1 at a Sequential Request bit in a Dataset Management field of the write command or (ii) performing control to transmit a write command that includes, as a recording destination, information designating a start portion of a recording area without including 1 at a Sequential Request bit in a Dataset Management field of the write command.

13. A non-transitory computer-readable storage medium which stores a program for causing a computer of a recording apparatus, which records data to a memory card, to execute a recording method comprising:
repeatedly transmitting a data write command that includes information designating recording target data and a recording destination to the memory card which manages a memory for data recording in the memory card as a plurality of recording areas and which can execute data recording with a guaranteed minimum recording speed in units of recording areas; and
controlling requesting the memory card to execute data recording with the guaranteed minimum recording speed or without the guaranteed minimum recording speed by a data write command, based on a combination of both of (i) whether or not a recording destination designated by the data write command is a start portion of one of the plurality of recording areas and (ii) whether or not the data write command includes data indicating a speed guarantee request,
wherein in a case of requesting the memory card to execute data recording with the guaranteed minimum recording speed, performing control to transmit a data write command that includes both of (a) information designating a start portion of a first recording area, which is one of the plurality of recording areas, as a recording destination and (b) the data indicating the speed guarantee request, and
wherein in a case of requesting the memory card to execute the data recording without the guaranteed minimum recording speed, (i) performing control to transmit a data write command that includes information designating, as a recording destination, a portion, different from a start portion, of one of the plurality of recording areas, regardless of whether or not the data write command includes the data indicating the speed guarantee request or (ii) performing control to transmit a data write command that includes, as a recording destination, information designating a start portion of one of the plurality of recording areas without including the data indicating the speed guarantee request.

14. A non-transitory computer-readable storage medium which stores a program for causing a computer of a recording apparatus, which records data to a memory card, to execute a recording method comprising:
repeatedly transmitting an NVMe standard-compliant write command that includes information designating recording target data and a recording destination to the memory card which can execute data recording with a guaranteed minimum recording speed;
controlling requesting the memory card to execute data recording with the guaranteed minimum recording speed or without the guaranteed minimum recording speed by a write command, based on a combination of both of (i) whether or not a recording destination designated by the write command is a start portion of a recording area and (ii) whether or not the write command includes 1 at a Sequential Request bit in a Dataset Management field of the write command,
wherein in a case of requesting the memory card to execute data recording with the guaranteed minimum recording speed, the control unit performs control to transmit a write command that includes both of (a) information designating a start portion of a first recording area as a recording destination and (b) 1 at a Sequential Request bit in a Dataset Management field of the first write command, and
wherein in a case of requesting the memory card to execute the data recording without the guaranteed minimum recording speed, (i) performing control to transmit a write command that includes information designating, as a recording destination, a portion, different from a start portion, of a recording area, regardless of whether or not the write command includes 1 at a Sequential Request bit in a Dataset Management field of the write command or (ii) performing control to transmit a write command that includes, as a recording destination, information designating a start portion of a recording area without including 1 at a Sequential Request bit in a Dataset Management field of the write command.

15. A memory card that has a memory for data recording and that manages the memory for data recording as a plurality of recording areas and can execute data recording with a guaranteed minimum recording speed, comprising at least one processor and/or at least one circuit which functions as:

a communication unit configured to perform communication with a host apparatus and receiving a data write command that includes information designating recording target data and a recording destination; and a control unit configured to, in a case where a data write command that includes data indicating a speed guarantee request and information that designates a start portion of a first recording area, which is one of the plurality of recording areas, as a recording destination is received, perform control such that data recording with the guaranteed minimum recording speed is executed with respect to the first recording area, and in a case where a data write command that does not include the data indicating the speed guarantee request and that includes the information that designates the start portion of the first recording area as the recording destination is received, perform control such that data recording with the guaranteed minimum recording speed is not executed with respect to the first recording area, wherein after reception of the first data write command that includes the data indicating the speed guarantee request and the information designating the start portion of the first recording area as the recording destination, if a second data write command that includes information that designates, as a recording destination, a portion, different from the start portion, of the first recording area is received, the control unit performs control such that data recording with the guaranteed minimum recording speed is executed even if the data indicating the speed guarantee request is not included in the second data write command.

16. The memory card according to claim 15, wherein
in a case where the data write command that includes the speed guarantee request and the information that designates the start portion of the first recording area as the recording destination is received, the control unit performs control such that the data recording with the guaranteed minimum recording speed is executed with respect to entirety of the first recording area, not only the start portion of the first recording area.

17. The memory card according to claim 15, wherein
the data write command is an NVMe standard-compliant write command, and
the speed guarantee request is a value of 1 being set at a Sequential Request bit in a Dataset Management field of the write command.

18. The memory card according to claim 15, wherein
in response to reception of the data write command that includes the speed guarantee request and the information that designates the start portion of the first recording area as the recording destination, the control unit performs control to execute preparation processing for executing data recording with the guaranteed minimum recording speed with respect to the first recording area including the start portion designated as the recording destination in the data write command.

19. A memory card that has a memory for data recording and that manages the memory for data recording as a plurality of recording areas and can execute data recording with a guaranteed minimum recording speed, comprising at least one processor and/or at least one circuit which functions as:

a communication unit configured to perform communication with a host apparatus and receiving an NVMe standard-compliant write command that includes information designating recording target data and a recording destination; and a control unit configured to, in a case where a write command that includes information designating a start portion of a first recording area, which is one of the plurality of recording areas, as a recording destination and that has 1 at a Sequential Request bit in a Dataset Management field is received, perform control such that data recording with the guaranteed minimum recording speed is executed with respect to the first recording area, and in a case where a write command that includes information designating the start portion of the first recording area as the recording destination and that has 0 at the Sequential Request bit in the Dataset Management field is received, perform control such that data recording with the guaranteed minimum recording speed is not executed with respect to the first recording area, wherein after reception of the first write command that includes the information designating the start portion of the first recording area as the recording destination and that has 1 at the Sequential Request bit in the Dataset Management field, if a second write command that includes information that designates, as a recording destination, a portion, different from the start portion, of the first recording area is received, the control unit performs control such that data recording with the guaranteed minimum recording speed is executed even if the second write command has 0 at a Sequential Request bit in a Dataset Management field.

* * * * *

UNITED STATES PATENT AND TRADEMARK OFFICE
CERTIFICATE OF CORRECTION

| | | |
|---|---|---|
| PATENT NO. | : 12,333,184 B2 | Page 1 of 1 |
| APPLICATION NO. | : 17/499267 | |
| DATED | : June 17, 2025 | |
| INVENTOR(S) | : Yasuhiro Shiraishi et al. | |

It is certified that error appears in the above-identified patent and that said Letters Patent is hereby corrected as shown below:

On the Title Page

Item (73) Assignee:
Delete:
"(73) Assignee: CANON KABUSHIKI KAISHA, Tokyo (JP)"
And insert:
--(73) Assignee: CANON KABUSHIKI KAISHA, Tokyo (JP); SONY GROUP CORPORATION, Tokyo (JP)--

Signed and Sealed this
Fifteenth Day of July, 2025

Coke Morgan Stewart
*Acting Director of the United States Patent and Trademark Office*